United States Patent [19]

Tashiro et al.

[11] Patent Number: 5,105,071
[45] Date of Patent: Apr. 14, 1992

[54] OPTICAL DATA TRANSFER DEVICE

[75] Inventors: Takeshi Tashiro, Mishima; Seiji Koike, Tagata; Kazuhiko Hiramatsu, Mishima, all of Japan

[73] Assignee: Tokyo Electric Co., Ltd., Tokyo, Japan

[21] Appl. No.: 637,630

[22] Filed: Jan. 4, 1991

[30] Foreign Application Priority Data

Jan. 9, 1990 [JP] Japan .................... 2-1982

[51] Int. Cl.⁵ ............................. G06K 7/10
[52] U.S. Cl. ................. 235/472; 235/455; 235/462
[58] Field of Search ............... 235/455, 462, 472; 250/205, 566, 568

[56] References Cited

U.S. PATENT DOCUMENTS 4,250,488 2/1981 Haupt .................................. 235/455
4,570,057 2/1986 Chadima, Jr. et al. .............. 235/472
4,970,379 11/1990 Danstrom ...................... 235/472 X

FOREIGN PATENT DOCUMENTS 2-89522 7/1990 Japan .

*Primary Examiner*—Harold Pitts
*Attorney, Agent, or Firm*—Oblon, Spivak, McClelland, Maier & Neustadt

[57] ABSTRACT

An information output projection of a handy terminal is adapted to engage an information input hole of a data processing device. A light shutting out member is provided between an opening of the information input hole and an information receiving element in the data processing device. The light shutting out member is adapted to be opened by a depression force of the information output projection when the information output projection is inserted from the opening of the information input hole thereinto. Accordingly, malfunction of the device due to entry of optical noise from the opening of the information input hole is prevented.

8 Claims, 6 Drawing Sheets

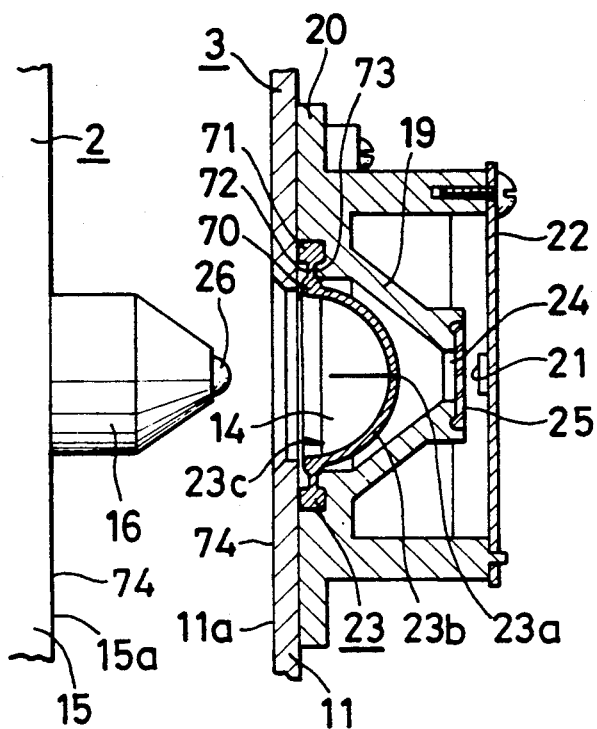
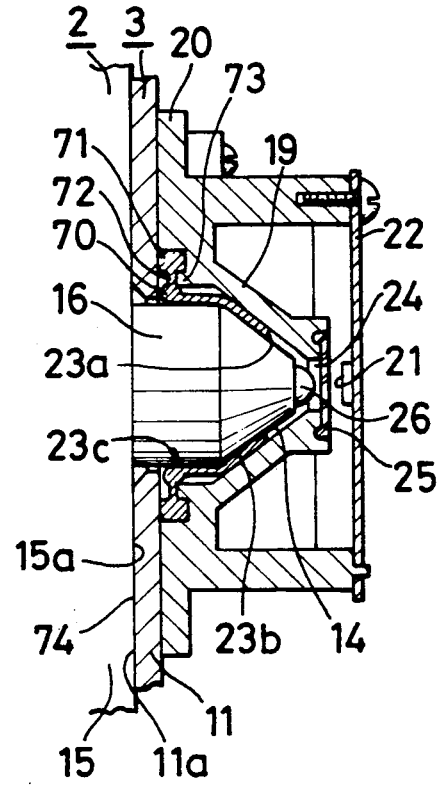
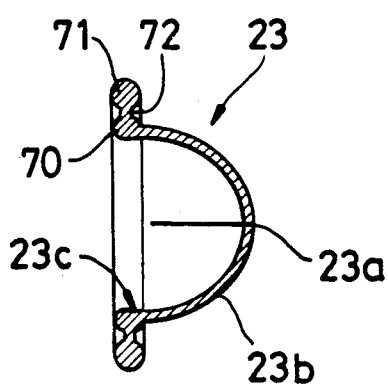
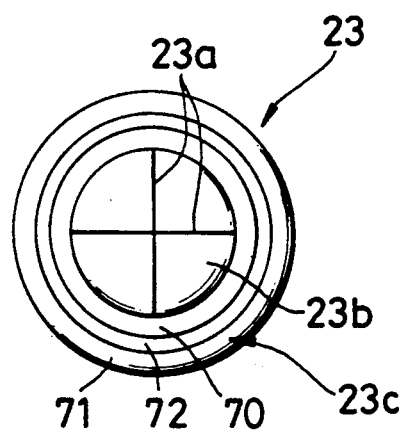

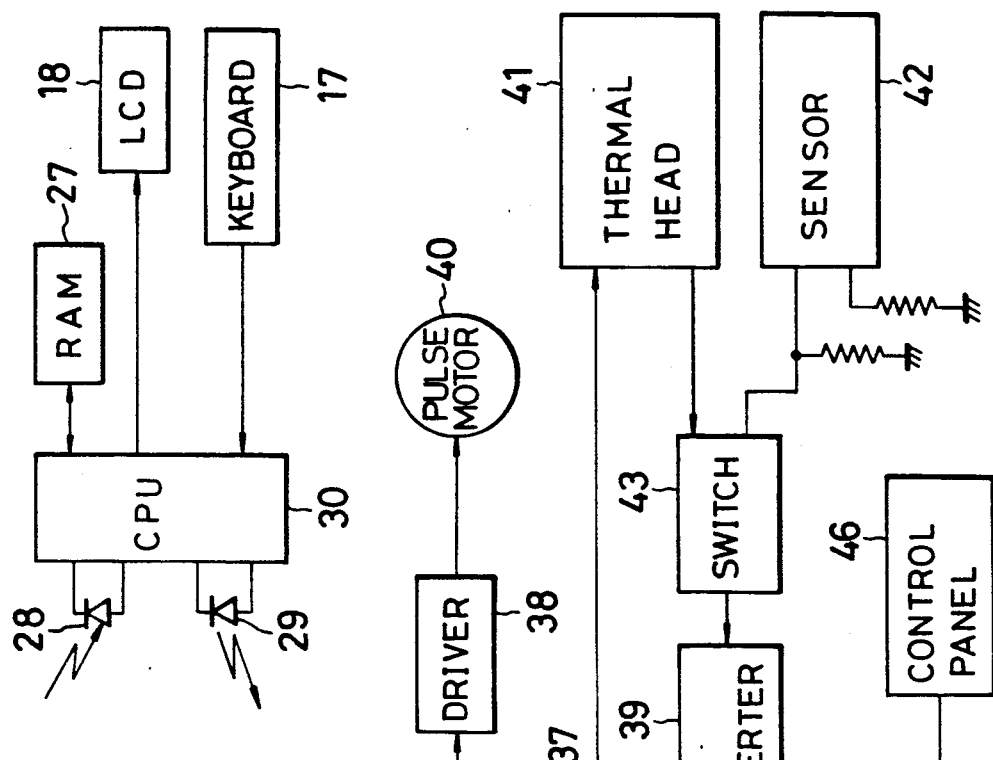
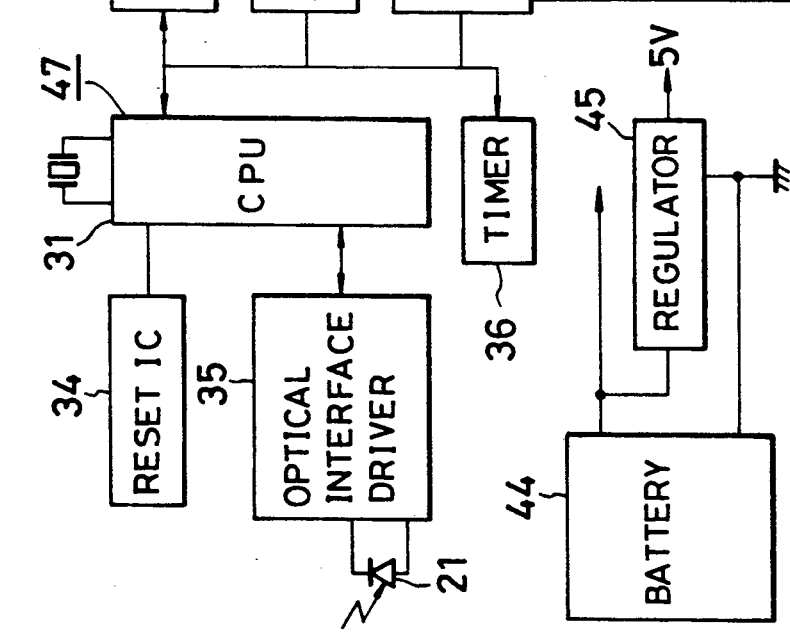

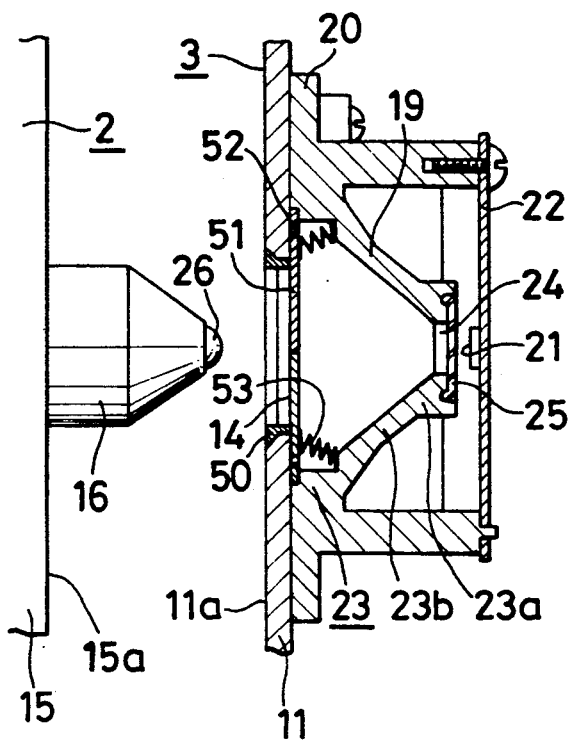
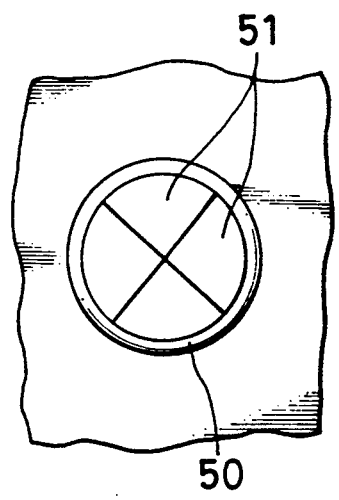
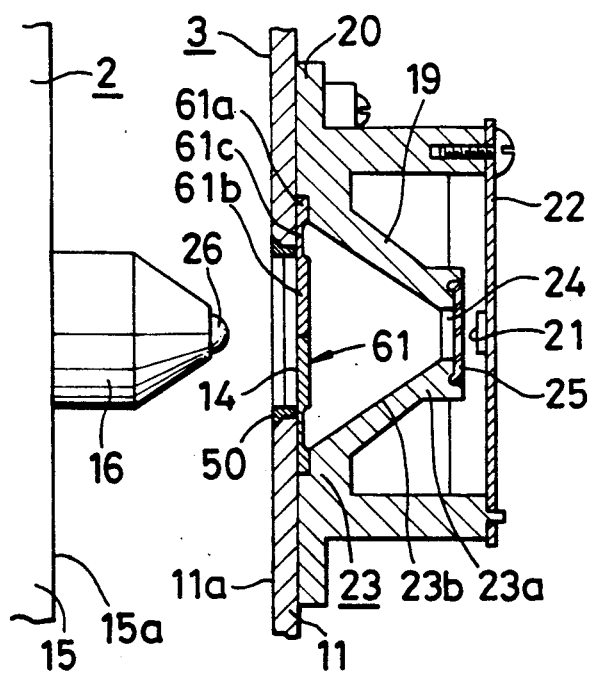

OPTICAL DATA TRANSFER DEVICE

FIELD OF THE INVENTION AND RELATED ART STATEMENT

The present invention relates to an optical data transfer device for transferring data input into a handy terminal and temporarily stored therein to a data processing device for carrying out various data processing operations by using wireless optical means, and more particularly to a connection structure between the data processing device and the handy terminal.

Conventionally, there exists means for transferring data such as a bar code created by a host computer through a connection cable to a printer and carrying out processing such as printing of a bar code label. Further, there also exists means for transferring data input by a keyboard to a printer connected through a connection cable to the keyboard and carrying out processing such as label printing according to the data transferred.

Such conventional techniques have the following shortcomings. That is, each of the above-mentioned means uses a connection cable for data transfer to a printer. Accordingly, in the case of carrying the printer in operation, the operation is hindered by the connection cable to reduce the operability. To cope with this problem, the present inventors have proposed that the data transfer to the printer is carried out by wireless means such as optical communication to thereby eliminate the connection cable. However, such a device has a problem such that optical noise will enter a light receiving portion in the printer to cause malfunction of the printer or inaccuracy of data transfer. Further, it is necessary to exactly define an optical path for data transfer.

OBJECT AND SUMMARY OF THE INVENTION

It is a first object of the present invention to provide an optical data transfer device which can prevent entry of optical noise into the light receiving portion.

It is a second object of the present invention to provide an optical data transfer device which can improve the operability of each of a data transferring side and a data receiving side.

It is a third object of the present invention to provide an optical data transfer device which can exactly define an optical path for data transfer.

It is a fourth object of the present invention to provide an optical data transfer device which can define the optical path for data transfer with easy operation.

According to the present invention, there is provided an optical data transfer device comprising a handy terminal which comprises information inputting means for inputting data, information storing means for temporarily storing the data input by said information inputting means, and an information output projection for optically outputting the data temporarily stored in said information storing means; and a data processing device which comprises an information input hole adapted to engage said information output projection, information receiving means for optically receiving the data output from said information output projection engaged with said information input hole, a light shutting out member provided between an opening of said information input hole and said information receiving means and adapted to be urged by said information output projection inserted from said opening into said information input hole, and data processing means for processing the data received by said information receiving means. With this construction, optical data transfer from the handy terminal to the data processing device is carried out under the condition where the information output projection is engaged with the information input hole. Under such an engaged condition of the information output projection of the handy terminal, the information receiving means in the data processing device is shut out from an external light by the information output projection. On the other hand, when the handy terminal is in disconnection from the data processing device, the information receiving means is shut out from the external light by the light shutting out member. Accordingly, malfunction of the data processing device due to entry of optical noise from the opening of the information input hole can be prevented. Further, it is not necessary to provide a data transfer connection cable for connecting the handy terminal with the data processing device, and both the components can be individually operated, thereby improving the operability. Additionally, an optical path for data transfer can be exactly defined by easy operation such as by engaging the information output projection with the information input hole.

BRIEF DESCRIPTION OF THE DRAWINGS

FIG. 2 is a vertical sectional view of a connection structure between the data processing device and the handy terminal under a disconnected condition thereof;

FIG. 3 is a vertical sectional view of the connection structure under a connected condition;

FIG. 4 is a vertical sectional view of an elastic member shown in FIG. 2;

FIG. 5 is an elevational view of the elastic member;

FIG. 8 is a block diagram showing an electrical connection in the handy terminal;

FIG. 9 is a block diagram showing an electrical connection in the data processing device;

FIG. 12 is a vertical sectional view similar to FIG. 2, showing a second preferred embodiment of the present invention;

FIG. 13 is an elevational view of a part of light shutting out members shown in FIG. 12; and FIG. 14 is a vertical sectional view similar to FIG. 12, showing a modification of the second preferred embodiment.

DESCRIPTION OF PREFERRED EMBODIMENTS

Figure 1:
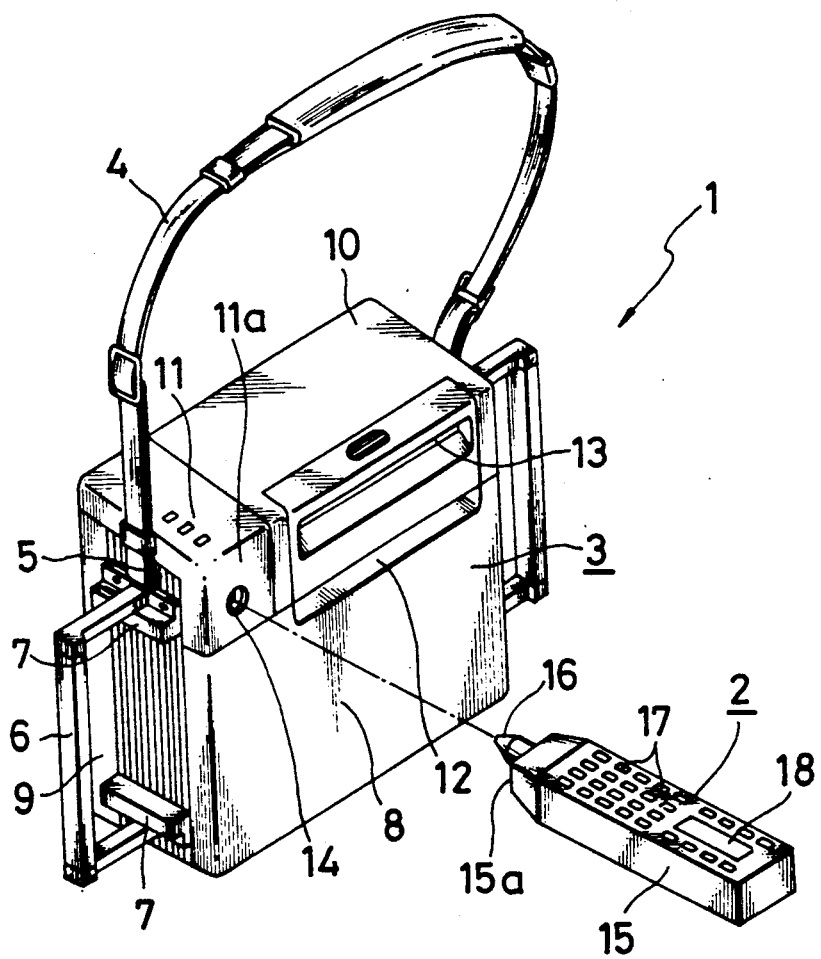
FIG. 1 is a perspective view of the optical data transfer device according to a first preferred embodiment of the present invention.
Figure 6:
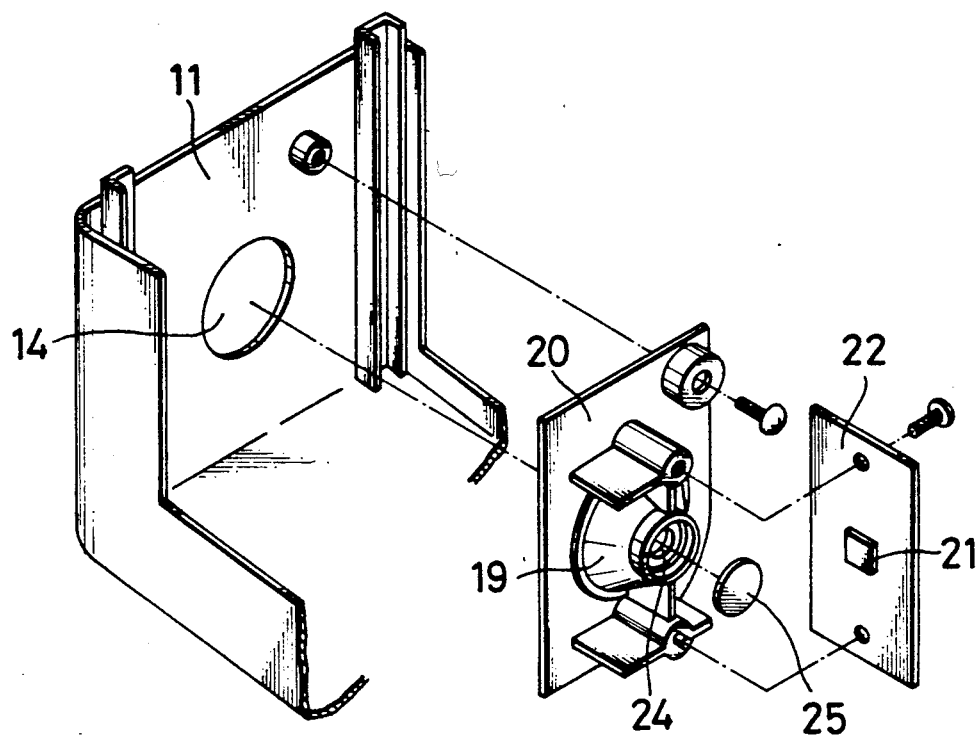
FIG. 6 is an exploded perspective view of a connecting portion of the data processing device to be connected to the handy terminal.
Figure 7:
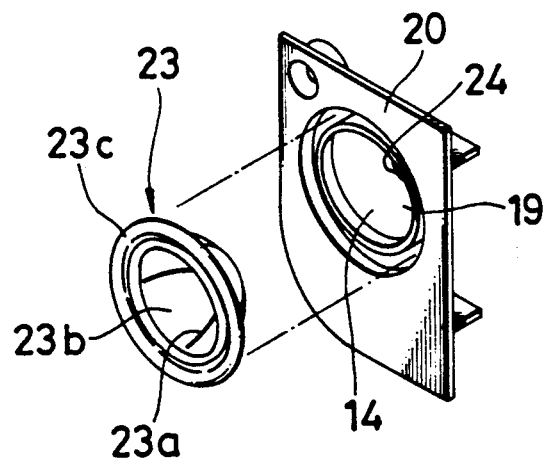
FIG. 7 is an exploded perspective view showing a mounting structure of the elastic member.

There will now be described a first preferred embodiment of the present invention with reference to FIGS. 1 to 11. Referring first to FIG. 1, an optical data transfer device 1 according to the present invention is intended to be applied to a bar code system, and the device 1 is constituted of a handy terminal 2 also serving as a bar code reader and a printer body 3 serving as a data processing device, both the components 2 and 3 being portable. A front surface 15a of a housing 15 of the handy terminal 2 is provided with an information input/output projection 16 serving as both the information inputting means and the information output projection according to the present invention, and an upper surface of the housing 15 is provided with a display 18 and a keyboard 17 serving as the information inputting means according to the present invention. More specifically, the information input/output projection 16 has a stepped tapering shape such that a circular cone is connected with a cylinder. An input/output lens 26 is mounted at a front end of the information input/output projection 16. A portion of the input/output lens 26 serves as both the information reading means and the information outputting means according to the present invention.

A shoulder belt 4 adjustable in length is provided on an upper portion of the printer body 3, and a pair of handles 6 are provided on opposite side surfaces of the printer body 3. Further, a pair of holders 5 for detachably holding the shoulder belt 4 are fixed on the opposite side surfaces of the printer body 3, and a pair of holders 7 for rotatably holding opposite ends of each handle 6 are fixed on each side surface of the printer body 3, so that the printer body 3 with the shoulder belt 4 and the handles 6 can be made compact. A housing of the printer body 3 is constructed of a front cover 8 and a rear cover 9 connected together, and a printer cover 10 and an interface cover 11 arranged in juxtaposition to each other on the upper ends of the front cover 8 and the rear cover 9. A label base sheet ejecting slot 12 laterally elongated is formed between the upper end of the front cover 8 and the lower end of the printer cover 10, and a label issuing slot 13 laterally elongated is formed through a front surface of the printer cover 10. Further, an information input hole 14 is formed through a front surface 11a of the interface cover 11.

Referring to FIGS. 2 to 7, an internal frame 20 serving as the supporting member according to the present invention is fixed by screws to an inside surface of the interface cover 11, and a PCB (printed circuit board) 22 is fixed by screws to a rear end of the internal frame 20. The internal frame 20 is integrally formed with a recessed wall portion 19 defining the information input hole 14 therein. A light receiving element 21 serving as the optical information receiving means according to the present invention is mounted on a front surface of the PCB 22. More specifically, the recessed wall portion 19 of the internal frame 20 is formed at its innermost end with a light transmitting hole 24 around which a protection filter 25 is mounted. The protection filter 25 is opposed to the light receiving element 21 on the PCB 22. Such a structure is shown in FIGS. 2, 3, 6 and 7.

An elastic member 23 serving as the light shutting out member according to the present invention is mounted between an inner circumferential surface of the recessed wall portion 19 of the internal frame 20 and the inside surface of the interface cover 11. As shown in FIGS. 4 and 5, the elastic member 23 formed of an elastic material such as rubber is comprised of a domed portion 23b formed with crossed slits 23a and an annular portion 23c integrally connected with an annular end of the domed portion 23b so as to be formed by connecting a small-diameter O-ring with a large-diameter O-ring. That is, the annular portion 23c is comprised of a retaining portion 70 formed by the small-diameter O-ring for retaining the information input/output projection 16 of the handy terminal 2 when it is inserted in the information input hole 14, a mounting portion 71 formed by the large-diameter O-ring for mounting the domed portion 23c between the inner circumferential surface of the recessed wall portion 19 of the internal frame 20 and the inside surface of the interface cover 11, and a positioning groove 72 circularly formed between the retaining portion 70 and the mounting portion 71 for engaging a positioning projection 73 formed on the internal frame 20. Accordingly, the elastic member 23 is fixedly positioned by sandwiching the mounting portion 71 between the inside surface of the interface cover 11 and the internal frame 20, and engaging the positioning projection 73 of the internal frame 20 with the positioning groove 72. The crossed slits 23a of the domed portion 23b of the elastic member 23 are normally closed by an elastic force of the domed portion 23b, while when a pressure is applied to an inner surface of the domed portion 23b, the domed portion 23b is elastically deformed to open the crossed slits 23a. That is, as shown in FIG. 3, when the information input/output projection 16 is inserted into the information input hole 14, the domed portion 23b of the elastic member 23 is urged to be elastically deformed to open the slits 23a, and simultaneously the information input/output projection 16 is elastically retained by the retaining portion 70 of the elastic member 23. Under this condition, the information input/output projection 16 is positioned in the information input hole 14 so that the input/output lens 26 of the information input/output projection 16 is exactly positioned in opposition to the light receiving element 21 on the PCB 22 through the light transmitting hole 24 and the protection filter 25 of the internal frame 20. Furthermore, under such a positioned condition, the front surface 15a of the housing 15 is in abutment against the front surface 11a of the interface cover 11. Accordingly, the front surfaces 11a and 15a are so formed as to serve as abutment positioning means 74 and 74', respectively.

Referring to FIG. 8 which shows a circuit construction of the handy terminal 2, a RAM 27 serving as the information storing means according to the present invention is connected to a CPU 30, and an optical reading portion 28 and a light emitting portion 29 located behind the input/output lens 26 in opposed relationship are also connected to the CPU 30. Furthermore, the keyboard 17 and the display 18 as mentioned above are connected to an input side and an output side of the CPU 30, respectively.

Referring to FIG. 9 which shows a circuit construction of the printer body 3, a ROM 32 preliminarily storing an operation program and fixed data, a RAM 33 for storing variable data, a reset IC 34, an optical interface driver 35, a timer 36 and an I/O port 37 are connected to a CPU 31 for carrying out total electrical control. The optical interface driver 35 constitutes photoelectric conversion means for converting an optical data received by the light receiving element 21 into an electrical signal. Further, a driver 38, a thermal head 41 and an A/D converter 39 are connected to the I/O port 37. Further, a pulse motor 40 for driving a platen (not shown) in a printer section (not shown) provided inside the printer cover 10 is connected to the driver 38. Further, a sensor 42 for detecting a temperature data of the thermal head 41 in the printer section is connected to the A/D converter 39 through a switch 43 for selectively conducting the temperature data. Further, an output from a battery 44 is adjusted by a regulator 45 to be supplied to both the thermal head 41 and the driver 38. A control panel 46 of the printer body 3 is connected to the I/O port 37. The control panel 46 is constituted of a keyboard and an LED for indicating various operational conditions. The CPU 31, the I/O port 37, the driver 38 and the pulse motor 40 constitute a print control section 47.

In operation, when a desired reading mode is selected by operating the keyboard 17 of the handy terminal 2, and the input/output lens 26 of the handy terminal 2 is scanned on a bar code attached on an article of commodity (not shown), the bar code is optically read by the optical reading portion 28, and a commodity data output from the optical reading portion 28 is temporarily stored into the RAM 27.

Then, the information input/output projection 16 of the handy terminal 2 having stored information of various commodities is brought into engagement with the information input hole 14 of the printer body 3. Under the engaged condition, a data transfer mode is selected by operating the keyboard 17, and a desired one of the commodity data stored in the RAM 27 is accessed. Accordingly, the desired commodity data thus accessed is output as an optical signal from the light emitting portion 29 of the handy terminal 2, and is received by the light receiving element 21 of the printer body 3. Then, the optical signal is converted into an electrical signal by the optical interface driver 35, and the electrical signal is input into the CPU 31 which in turn controls to output a print signal to the thermal head 41 in the printer section. Accordingly, the thermal head 41 is driven according to the print signal, and the pulse motor 40 is operated in synchronism with the thermal head 41. As a result, a label sheet (not shown) is printed by the thermal head 41, and is fed to a predetermined position by the pulse motor 40.

Thus, a bar code label (not shown) corresponding to the bar code read by the handy terminal 2 is issued from the label issuing slot 13 of the printer body 3.

In the optical data transfer device 1 as mentioned above, the contents of the data stored in the RAM 27 can be modified, or additional data can be stored into the RAM 27 by operating the keyboard 17 before transferring the commodity data from the handy terminal 2 to the printer body 3. The condition of such modification or addition of the data can be confirmed on the display 18 of the handy terminal 2.

Further, the data to be temporarily stored into the RAM 27 and then transferred from the handy terminal 2 to the printer body 3 may be input by operating the keyboard 17 rather than by reading a bar code. In this case, a commodity data input by the keyboard 17 and transferred to the printer body 3 is processed by a program as print commodity data creating means preliminarily stored in the ROM 32.

As described above, according to the optical data transfer device 1, as the commodity data is transferred by engaging the handy terminal 2 with the printer body 3, a cable as data transfer means for connecting the handy terminal 2 with the printer body 3 is not necessary, but both the components 2 and 3 can be individually operated, thereby contributing to the improvement in operation efficiency. Further, as the data transfer from the handy terminal 2 to the printer body 3 is carried out by optical communication, illumination for reading of a bar code can be utilized for the light emitting portion 29 for outputting of data. In this case, an optical system of a conventional handy terminal (not shown) can be utilized, so that the structure may be simplified and an increase in number of parts may be prevented. Further, as the input/output lens 26 is located at the front end of the information input/output projection 16, the operability in reading the information can be improved, and the operability in inserting the information input/output projection 16 into the information input hole 14 of the printer body 3 can also be improved.

Furthermore, according to the optical data transfer device 1, the information input/output projection 16 of the handy terminal 2 connected with the printer body 3 is elastically retained by the retaining portion 70 of the elastic member 23 in the information input hole 14, and the abutment positioning portion 74' as the front surface 15a of the housing 15 is in abutment against the abutment positioning portion 74 as the front surface 11a of the interface cover 11, thereby exactly positioning the information input/output projection 16 of the handy terminal 2. Therefore, an optical path for data transfer can be formed easily and very exactly, thereby obtaining a high S/N ratio. Additionally, as the handy terminal 2 is not required to be held by an operator's hand during transferring of the commodity data, the operability can be improved.

Furthermore, according to the optical data transfer device 1, as the light receiving element 21 located behind the innermost end of the information input hole 14 of the printer body 3 is normally shutting out from an external light by the domed portion 23b of the elastic member 23, it is possible to prevent that optical noise will enter the light receiving element 21 from the opening of the information input hole 14 to cause malfunction of the printer body 3. Moreover, the domed portion 23b of the elastic member 23 for shutting out the light receiving element 21 of the printer body 3 is opened at the slits 23a when a pressure is applied to the inner surface of the domed portion 23b, while when the pressure is removed, the domed portion 23b restores its original condition owing to its elasticity. Accordingly, by inserting the information input/output projection 16 of the handy terminal 2 into the information input/output hole 14 of the printer body 3 or removing the information input/output projection 16 out of the information input hole 14, the domed portion 23b of the elastic member 23 is automatically operated, thereby eliminating the need of special control and operation for the domed portion 23b. Further, the domed portion 23b for shutting out the light receiving element 21 of the printer body 3 is integrally formed with the retaining portion 70 for retaining the information input/output projection 16 of the handy terminal 2 to construct the elastic member 23. Accordingly, the number of parts and the number of manufacturing steps can be reduced to thereby improve the productivity. Further, as the positioning projection 73 of the internal frame 20 is engaged with the positioning groove 72 of the elastic member 23, the elastic member 23 can be easily positioned by simply mounting the internal frame 20 on the inner surface of the interface cover 11 with the elastic member 23 sandwiched therebetween. Accordingly, also from this viewpoint, the productivity can be improved. Further, owing to the domed shape of the domed portion 23b of the elastic member 23, a relatively large restoring force in a closing direction of the slits 23a is generated. Accordingly, separation of the slits 23a due to fatigue of the domed portion 23b by repeated use can be prevented.

Furthermore, according to the optical data transfer device 1, the printer body 3 is provided with the shoulder belt 4 and the handles 6 so as to be used in various circumstances. For example, in the case that a suitable table for placing the printer body 3 is not present near, the printer body 3 may be suspended from an operator's shoulder with the shoulder belt 4 to carry out the label issuing operation. In this case, since the handles 6 are provided on the opposite side surfaces of the printer body 3, and the shoulder belt 4 is provided on the upper surface of the printer body 3, the control panel 46 can be readily operated without hindrance of the handles 6 if it is located on the upper surface of the printer body 3.

Although the optical data transfer device 1 according to the preferred embodiment is intended to be applied to a bar code system, it is to be noted that the present invention is not limited to the above system. For instance, the data processing device may be constructed as a cash register, and a sales data to be stored into the handy terminal may be transferred to the cash register.

Figure 10:
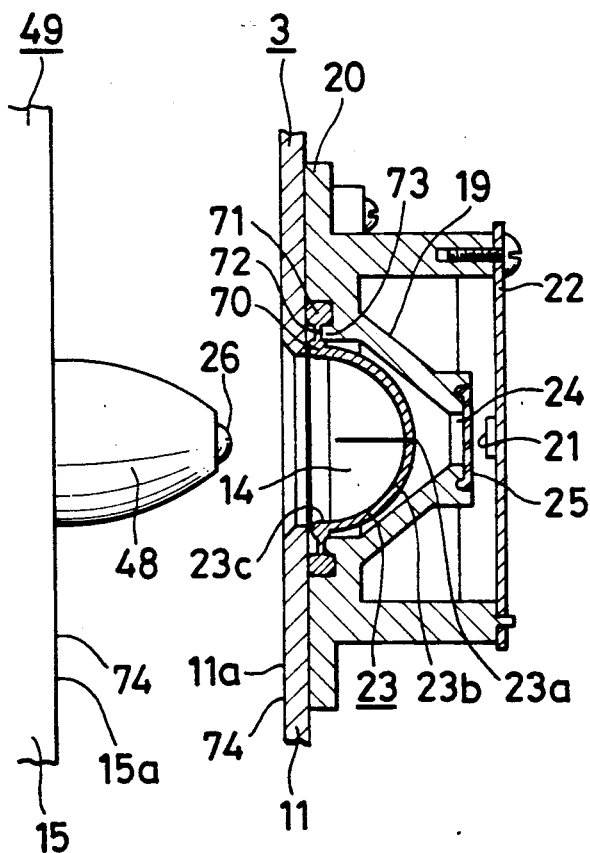
FIG. 10 is a vertical sectional view similar to FIG. 2, showing a modification of the first preferred embodiment.
Figure 11:
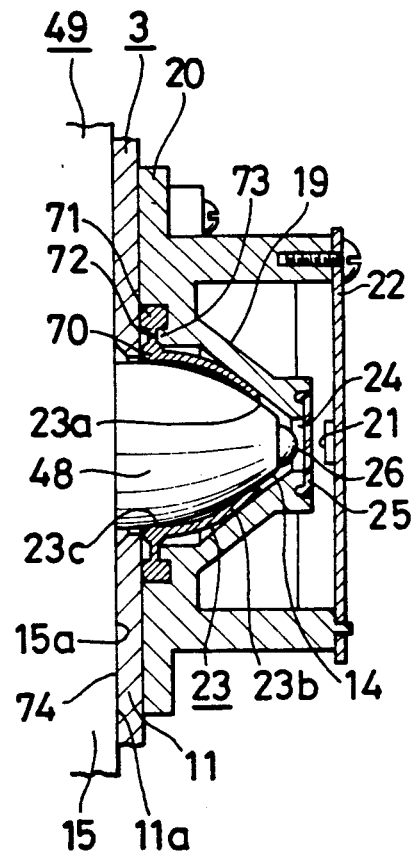
FIG. 11 is a vertical sectional view similar to FIG. 3, according to the modification of FIG. 10.

Further, while the structure of the information input-/output projection 16 of the handy terminal 2 in the optical data transfer device 1 according to the above preferred embodiment is of a stepped tapering form such that a circular cone is connected with a cylinder, a modification of the structure may be made as shown in FIGS. 10 and 11, wherein the outer peripheral surface of an information input/output projection 48 of a handy terminal 49 is curved to gradually taper toward the front end thereof.

There will now be described a second preferred embodiment of the present invention with reference to FIGS. 12 to 14, in which the same parts as those in the first preferred embodiment are designated by the same reference numerals, and the explanation thereof will be omitted hereinafter. In the second preferred embodiment, a retaining member 50 for engageably retaining the information input/output projection 16 of the handy terminal 2 is mounted at the opening of the information input hole 14. Four pieces of sectoral plate-like light shutting out members 51 are provided in the information input hole 14 and pivotably mounted to respective hinges 52 fixed to the inside surface of the interface cover 11. As shown in FIG. 13, the light shutting out members 51 are arranged under the closed condition such that all the adjacent radii of the sectoral light shutting out members 51 are in close contact with each other. Further, a spring 53 for biasing each light shutting out member 51 in a closing direction thereof is interposed under compression between each light shutting out member 51 and the internal frame 20.

With this construction, when the information input-/output projection 16 of the handy terminal 2 is inserted into the information input hole 14, the light suhtting out members 51 are urged by the information input/output projection 16 to rotate about the hinges 52 and thereby open against the biasing force of the springs 53. Accordingly, data transfer from the handy terminal 2 to the printer body 3 can be carried out. Thereafter, when the information input/output projection 16 is removed from the information input hole 14, the light shutting out members 51 are closed by the biasing force of the springs 53, thus preventing entry of optical noise into the light receiving element 21.

As a modification of the above preferred, the spring 53 may be replaced by a leaf spring as shown in FIG. 14. That is, sectoral light shutting out members 61 are provided in the information input hole 14. Each light shutting out member 61 is integrally formed with a fixing portion 61a fixedly sandwiched between the interface cover 11 and the internal frame 20, a light shutting out portion 61b opposed to the opening of the information input hole 14, and a spring portion 61c as the leaf spring formed between the fixing portion 61a and the light shutting out portion 61b. The spring portion 61c has a wall thickness smaller than that of the other portions so as to function as the leaf spring.

What is claimed is:

1. An optical data transfer device comprising:
   a hand-held terminal comprising information inputting means for inputting data, information storing means for temporarily storing the data input by said information inputting means, and an information output projection for optically outputting the data stored in said information storing means; and
   a data processing device comprising an information input hole adapted to engage said information output projection, information receiving means for optically receiving the data output from said information output projection engaged with said information input hole, a light shutting out member provided between an opening of said information input hole and said information receiving means and urged by said information output projection inserted from said opening into said information input hole, and data processing means for processing the data received by said information receiving means.

2. The optical data transfer device as defined in claim 1, wherein said information inputting means comprises a bar code reader having reading means, and said information output projection includes outputting means, both said reading means of said bar code reader and said outputting means of said information output projection being located at the same position.

3. The optical data transfer device as defined in claim 2, wherein said reading means of said bar code reader and said outputting means of said information output projection are located at a front end of said information output projection.

4. The optical data transfer device as defined in claim 1, wherein said light shutting out member comprises an elastic member having at least one slit.

5. The optical data transfer device as defined in claim 4, wherein said light shutting out member has a domed portion projecting toward said information receiving means.

6. The optical data transfer device as defined in claim 4, wherein said light shutting out member is integrally formed with a retaining portion for engageably retaining said information output projection inserted into said information input hole, and said hand-held terminal and said data processing device are formed with a pair of mating abutment positioning portions adapted to abut against each other under the condition where said information output projection is fully engaged with said information input hole.

7. The optical data transfer device as defined in claim 6, wherein said light shutting out member is integrally formed with a mounting portion extending from said retaining portion toward an inner surface of said information input hole and with a positioning groove formed between said mounting portion and said retaining portion, and said data processing device further comprises a pair of supporting members for supporting said light shutting out member, at least one of said supporting members having a positioning projection engaging said positioning groove, said mounting portion of said light shutting out member being sandwiched by said supporting members.

8. The optical data transfer device as defined in claim 1, wherein said light shutting out member comprises a plate member adapted to be opened toward said information receiving means and a spring for biasing said plate member in a direction away from said information receiving means.

* * * * *